Oct. 17, 1939.  J. J. GOUGH  2,176,855
ELECTRIC APPLIANCE
Filed Jan. 29, 1938  4 Sheets-Sheet 1
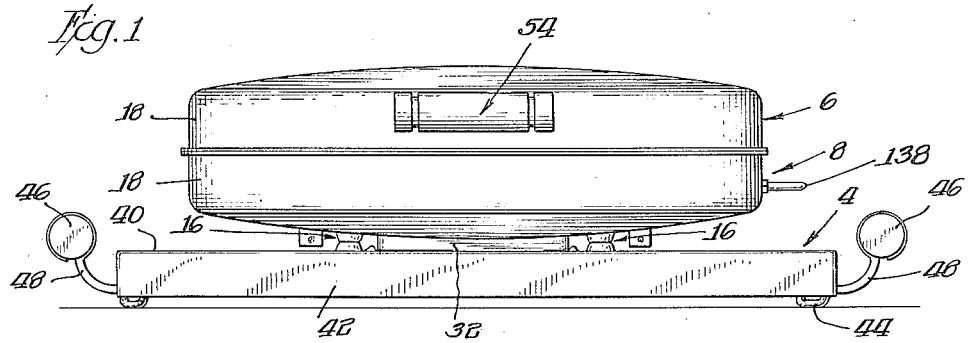
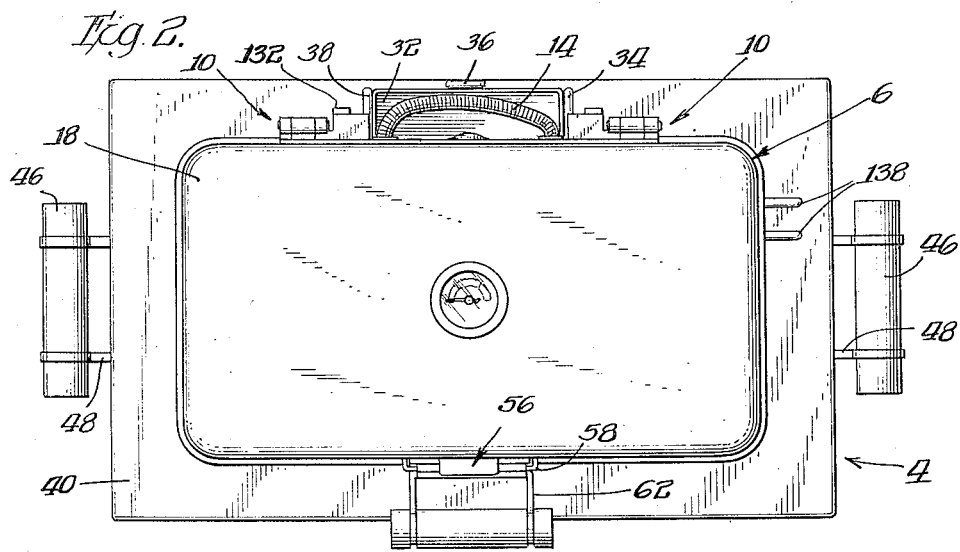
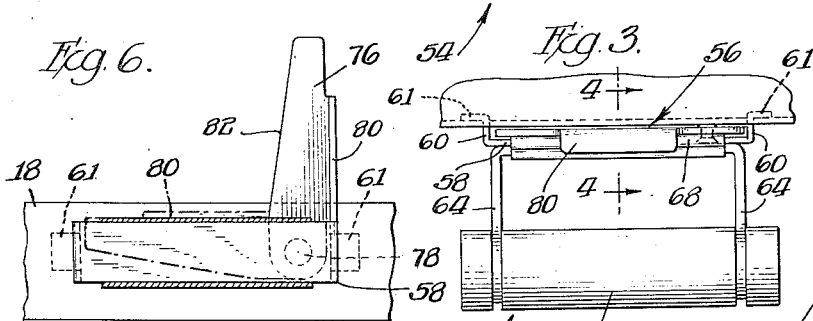
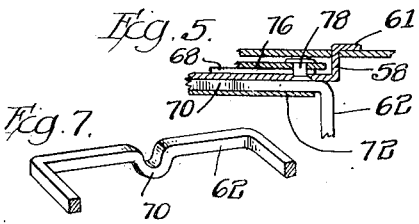
Inventor:-
James J. Gough
By:- Cox & Moore attys.

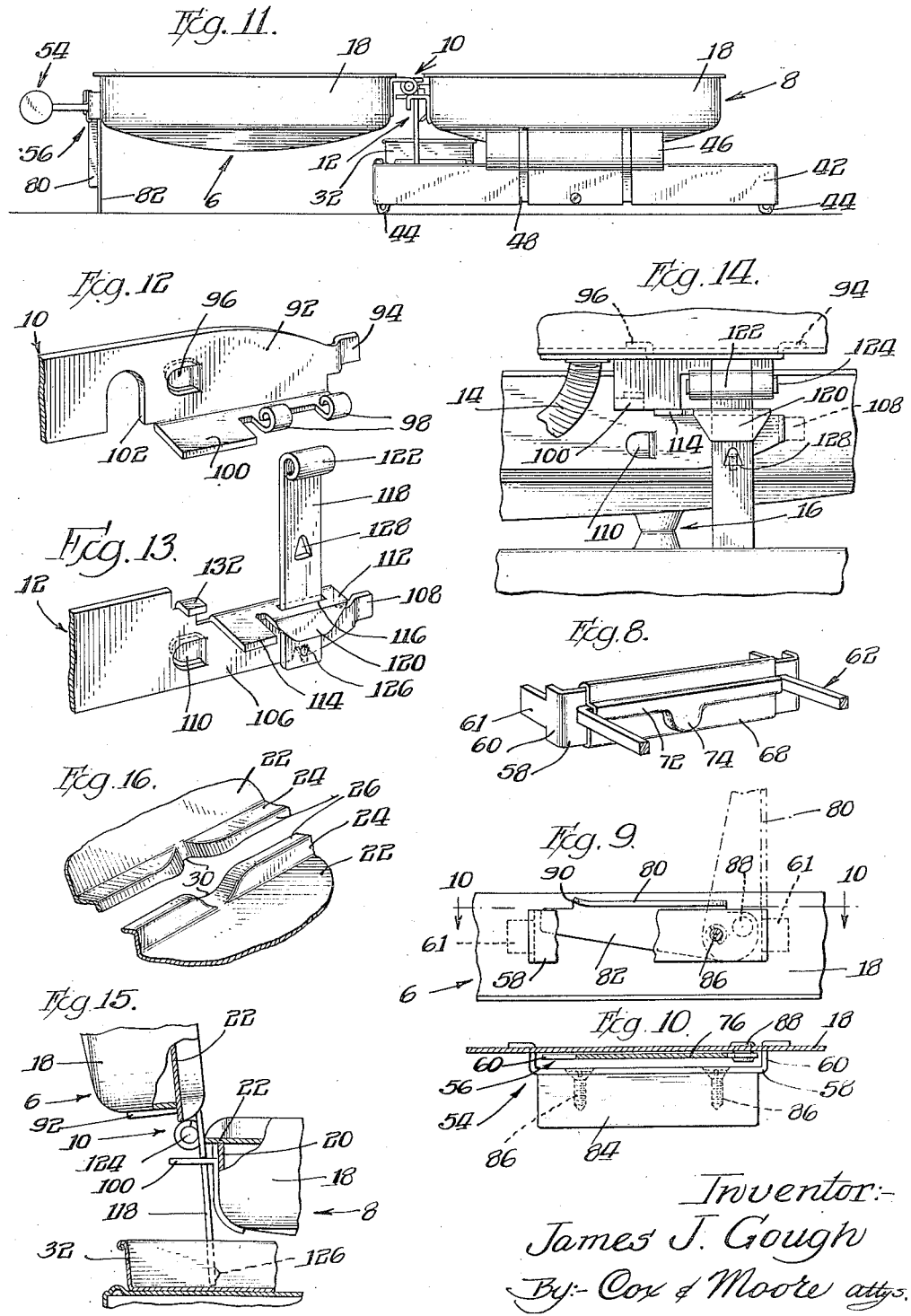

Oct. 17, 1939.    J. J. GOUGH    2,176,855
ELECTRIC APPLIANCE
Filed Jan. 29, 1938    4 Sheets-Sheet 3
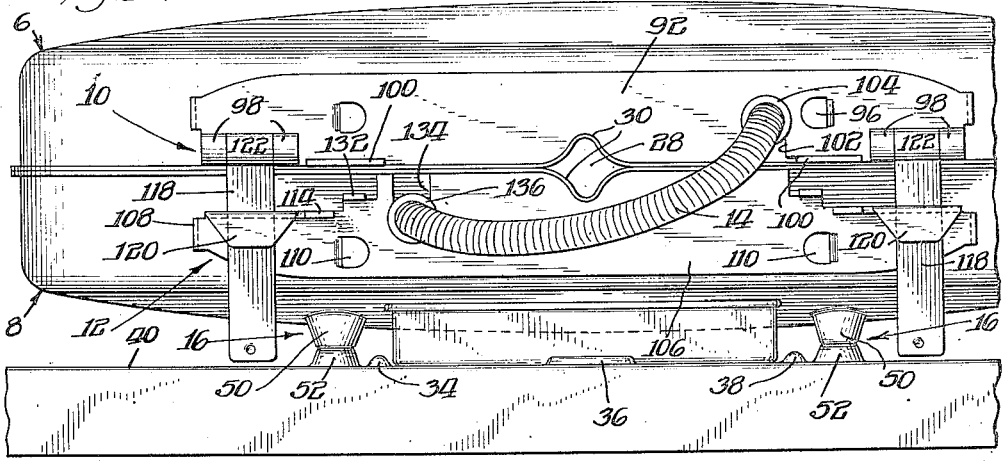
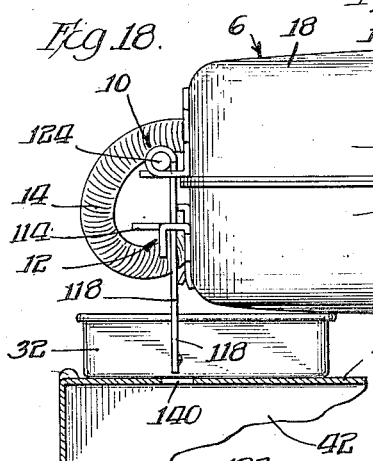
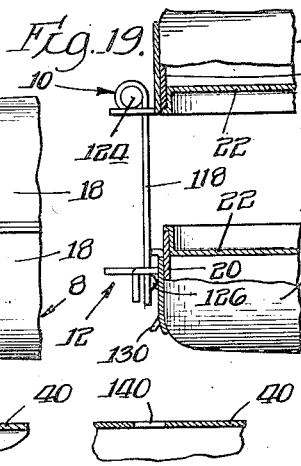
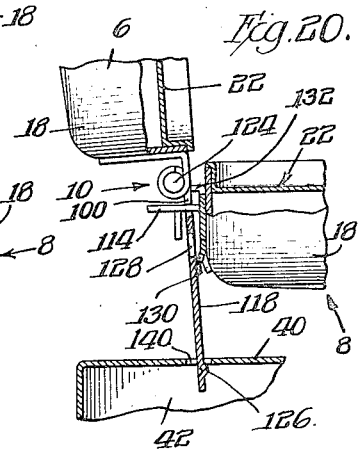
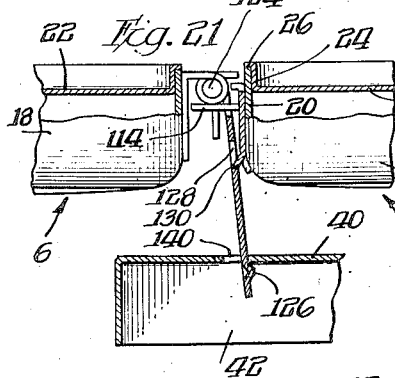
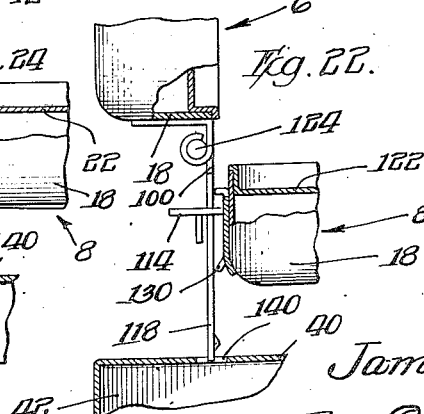
Inventor:
James J. Gough
By:- Cox & Moore
Attys.

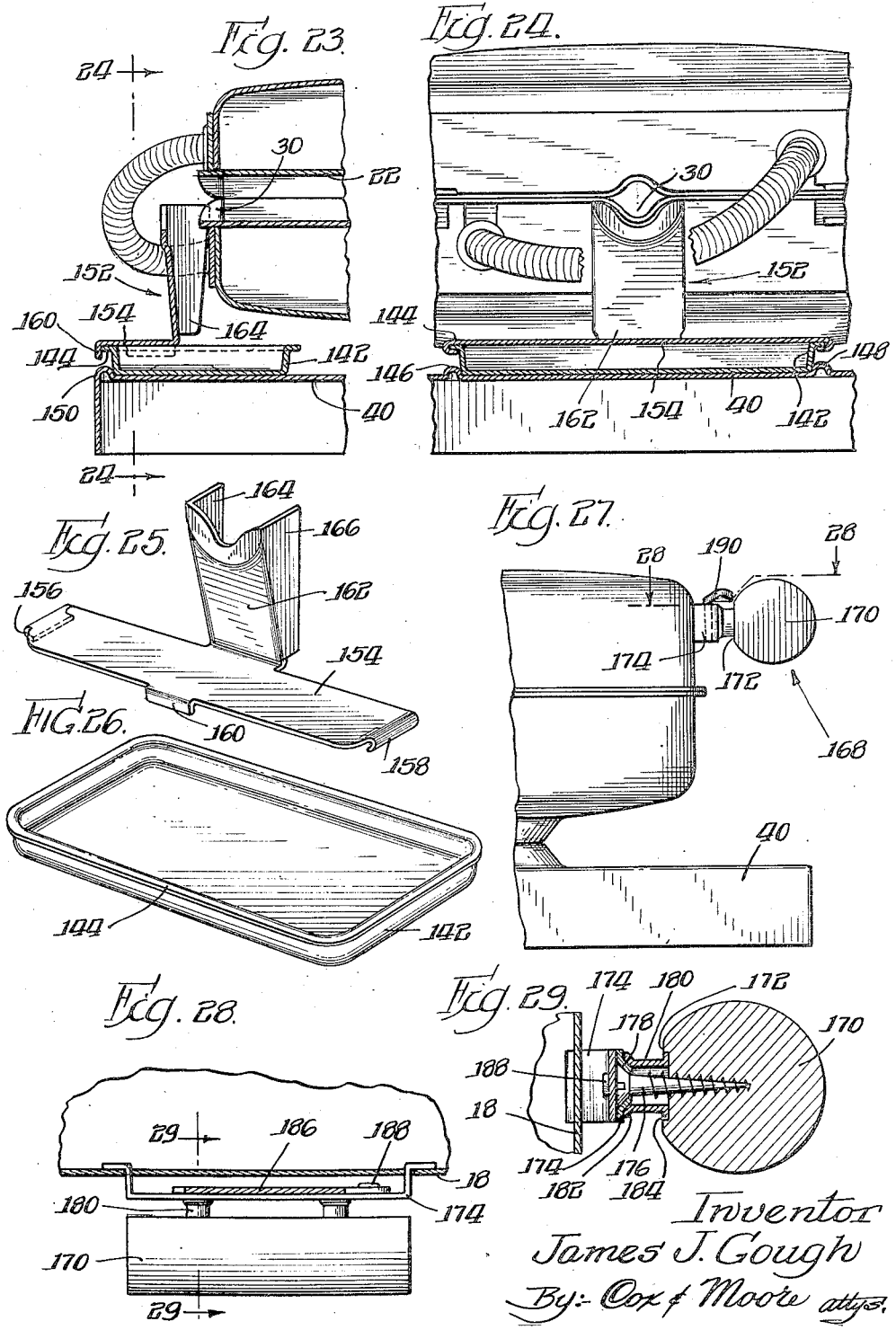

Patented Oct. 17, 1939

2,176,855

UNITED STATES PATENT OFFICE 2,176,855

ELECTRIC APPLIANCE

James J. Gough, Chicago, Ill., assignor to Chicago Electric Manufacturing Company, Chicago, Ill., a corporation of Illinois Application January 29, 1938, Serial No. 187,710

21 Claims. (Cl. 53—5)

This invention relates to an electrical appliance and more particularly to an electrical cooking or baking appliance.

It is an object of my invention to provide an electric heating appliance especially adapted for use as a sandwich toaster and grill and which is relatively simple in construction, durable and comparatively inexpensive to manufacture.

Another object is to provide an electric cooking or baking appliance comprising two sections hinged together in such manner that the upper section may readily move vertically upon expansion or contraction of the article of food being cooked or heated between the two sections.

A further object of the invention is to provide in an electric cooking appliance or sandwich toaster, simple and durable hinge means of such construction that the upper section may be swung to an intermediate position to permit the placing of the article of food on the lower section or to an extreme inverted horizontal position to permit use of the cooking appliance or toaster as a grill of two sections, the hinge means automatically retaining and supporting the upper section in either of said positions.

A still further object is the provision of normally concealed means readily operable to an extended position to provide an auxiliary support for the upper section in its inverted position. The invention also contemplates a construction in which the auxiliary support is concealed by the handle for the upper section and is attached to said section conjointly with said handle and without auxiliary fastening elements.

Another object resides in the provision of a hinge between the upper and lower heating sections which permits ready vertical movement of the upper section to accommodate articles of different thicknesses and shapes.

A further object of the invention is to provide an electric cooking or baking appliance in which means are provided for draining the grids of both sections in every position which these grids may assume to prevent the accumulation on the grids of drippings from the articles being cooked or baked.

The invention further contemplates the provision of means for directing the drippings from the grids into a suitable receptacle and means for preventing splashing of these drippings out of said receptacle.

Other and further objects and advantages of the invention will be apparent from the following description when taken in connection with the accompanying drawings in which:

Fig. 1 is a view in elevation of an electrical appliance embodying the invention.

Fig. 2 is a plan view of the same.

Fig. 3 is an enlarged, fragmentary, plan view of the handle and the auxiliary supporting leg for the upper section of the appliance.

Fig. 4 is a fragmentary, vertical section taken along the line 4—4 of Fig. 3.

Fig. 5 is a fragmentary, horizontal section taken along the line 5—5 of Fig. 4.

Fig. 6 is a fragmentary, vertical section taken along the line 6—6 of Fig. 4.

Fig. 7 is a fragmentary, perspective view of an element of the handle assembly.

Fig. 8 is a perspective view of a portion of the handle assembly prior to its fastening to the upper section of the appliance.

Fig. 9 is a fragmentary view in elevation and partly in section showing a modified form of the handle for the upper section.

Fig. 10 is a fragmentary, horizontal section taken along the line 10—10 of Fig. 9.

Fig. 11 is a reduced end elevation showing the upper section in inverted horizontal position.

Figs. 12 and 13 are enlarged fragmentary views in perspective of the hinge means.

Fig. 14 is an enlarged fragmentary rear elevation showing the position of the hinge elements when the upper section is in its intermediate locked position.

Fig. 15 is a fragmentary view in elevation and partly in section showing the drain for the grid sections and the pan for receiving the drippings therefrom.

Fig. 16 is a fragmentary, perspective view showing the drain for the grid sections.

Fig. 17 is an enlarged, fragmentary rear elevation of the appliance.

Fig. 18 is a fragmentary view in elevation and partly in section of one end of the appliance.

Figs. 19 to 22 are fragmentary views in elevation and partly in section showing the different positions of the hinge elements for different positions of the upper section.

Fig. 23 is a fragmentary sectional view somewhat similar to Fig. 15 and showing means for directing the drippings from the grids into a receptacle and for preventing splashing of the drippings out of the receptacle.

Fig. 24 is a fragmentary vertical section taken substantially along the line 24—24 of Fig. 23.

Fig. 25 is a perspective view of one of the elements of Figs. 23 and 24.

Fig. 26 is a perspective view of the drip catching receptacle.

Fig. 27 is a fragmentary view in elevation showing another modified form of the handle for the upper section.

Fig. 28 is a fragmentary horizontal section taken substantially along the line 28—28 of Fig. 27.

Fig. 29 is a fragmentary vertical section taken along the line 29—29 of Fig. 28.

As shown in the drawings, the electric cooking appliance or combined sandwich toaster and grill comprises a base 4 and upper and lower heating sections 6 and 8, the upper section 6 being connected to the lower section by interfitting hinge means 10 and 12 and a flexible electric cable 14 and the lower section 8 being supported on and spaced from the upper surface of the base 4 by feet 16.

Each of the sections 6 and 8 comprises a shell 18 having a peripheral flange 20 and a grid or grill 22 having a peripheral flange 24 which terminates in an outwardly directed flange 26 which is adapted to overlie and engage the upper edge of the flange 20 of the shell 18, the flange 24 of each grid engaging the flange 20 of the shell 18 to prevent movement of the grid within the shell.

The flange 20 along the rear side of each shell 18 is cut away centrally as at 28 (Fig. 17) to receive the drains 30 (Figs. 15 and 16) formed centrally of the rear edges of the upper and lower grids as by bending or depressing the flanges 24 and 26 into the plane of the base of the grid. A pan or other receptacle 32 is supported on the base 4 between positioning lugs 34, 36 and 38 struck out from the base, the pan 32 catching the drippings from the drains 30 and being readily removed from the base to permit cleaning.

The base 4 comprises a plate 40 having a depending peripheral flange 42, spaced feet 44 secured to the plate 40 in any desired manner, and handles 46 secured to the opposite ends of the plate 40 as by bars or straps 48 encircling the handles and secured to the flange 42. The feet 16, supporting the lower section 8 on the base 4, preferably comprise spaced bosses 50 and 52 stamped in the base of the shell 18 of the lower section and the plate 40 and secured by suitable rivets or bolts passing through said bosses.

The upper section 6 is provided with a handle assembly or means 54, Figs. 1 to 8 and 11, by which the upper section is moved relative to the lower section, this handle assembly forming a mounting for an auxiliary means 56 for supporting the upper section when the same is moved to its inverted position, as shown in Fig. 11.

The handle assembly or means (shown in detail in Figs. 3 to 8) comprises a supporting bar or strap 58 having inwardly directed flanges 60 each having a projecting lug 61 of reduced width adapted to pass through suitable openings provided in the peripheral flange 20 of the upper section above its grid 22 and to be bent over into engagement with the inner surface of said flange to which it is secured as by welding or otherwise, as shown in Fig. 3. The handle stirrup or bar 62, having forwardly directed, opposite end portions 64 to receive a handle 66 of heat insulating material, is secured to the strap or bar 58 by a clamp 68 having its upper and lower ends or edges crimped over the bar 58 in order to prevent any movement of the handle 66 and stirrup 62 relative to the supporting bar or strap 58. The stirrup 62 is centrally depressed to form a lug or protuberance 70 and the clamp 68 is provided with a longitudinally extending channel portion 72 for receiving the transverse portion of the stirrup 62 and a downwardly depending pocket 74 of a shape similar to the lug 70 to closely receive and encircle said lug.

It will be seen that this handle assembly 54 is particularly simple in construction and can be inexpensively manufactured, while at the same time it is not subject to being loosened by long use.

The auxiliary means 56 for supporting the upper section 6 in its inverted position preferably comprises a small plate or leg 76 (Figs. 2, 3, 5 and 6) pivoted to the bar or strap 58 as by a rivet 78 and positioned within the pocket formed between the shell 18 of the section 6 and the transverse portion of the bar or strap 58. The plate or leg 76 is provided with a forwardly bent flange 80 adapted to engage and overlie the upper edge of the clamp 68 when the leg is in its collapsed position. The side edge of the flange 80 nearest the pivot 78 is spaced therefrom such a distance that when the leg or plate 76 is in extended position the flange 80 will engage the bar or strap 58 to limit the movement of the leg and to more firmly support the upper section in its inverted position. The edge 82 of the plate or leg 76 opposite the flange 80 is beveled or tapered inwardly from its pivoted end to its other free end whereby the force upon the leg when the same is supporting the upper section 6 in inverted position tends to move this leg in the direction to maintain the flange 80 in engagement with the strap 58.

It will be seen from this description that the auxiliary means 56 for supporting the upper section 6 in inverted position is normally concealed by the handle assembly 54 but is readily operable to extended position, in which position it is maintained by the weight of the supported section.

The flange 80 also provides a ready means for moving the leg 76 from its collapsed position to its extended position.

In the modification shown in Figs. 9 and 10, the handle 84 comprising a block of insulating material is directly secured to the front face of the transverse portion of the strap 58 as by screws 86. In this form the plate or leg 76 of the auxiliary supporting means 56 is pivoted to the shell 18 of the upper section by a rivet or eyelet 88 within the pocket formed by the strap 58 and the shell 18. The end of the flange 80 nearest the free end of the leg 76 is in this form bent or turned upwardly as shown at 90 (Fig. 9) to provide a space between the handle 84 and the flange 80 to facilitate ready manipulation of the leg from its collapsed position.

The hinge means 10 comprises a plate or strap 92 of sheet metal having end lugs 94 passing through suitable openings in the shell 18 and bent over within the shell to retain the hinge strap in position on the shell. Additional lugs 96 are provided intermediate the ends of the hinge strap and are similarly passed through openings in the shell 18 and are bent over within the shell for further supporting the hinge strap. Adjacent each end of the hinge strap 92 are provided laterally extending, spaced lugs 98 which are curled over to provide hinge pintles, and adjacent these hinge lugs are provided laterally extending lugs or stops 100. In juxtaposition to the right-hand stop or lug 100 (Fig. 17), the strap 92 is provided with a slot 102 in registry with a like slot in the shell 18 of the upper section and through these alined slots the cable 14 passes into the upper shell where it is secured to the usual heating element (not shown). A ring or eyelet 104 (Fig. 17) maintains the cable in its proper position in these slots. Centrally and at its lower edge, the strap 92 is provided with an opening in registry with the opening at 28 in the shell 18 of the upper section, the opening in the strap receiving the drain 30 of said section.

The hinge means 12 comprises a plate or strap of sheet metal 106 similar to the sheet metal plate or strap 92 and similarly provided with end attaching lugs 108 and intermediate attaching lugs 110. Adjacent each end of the strap 106 a portion of the strap is bent or otherwise formed to provide laterally extending lugs 112 and 114. The lug 112 is slotted as at 116 to receive a hinge blade 118 and the outer end of the lug is bent downwardly to provide a stop 120. The hinge blade 118 is curled over at the upper end to provide a hinge pintle 122 which is hingedly connected to the hinge pintle 98 of the upper hinge means by a pin 124, the opposite ends of which may be peened over or enlarged so that it may not become loose from the hinge pintles.

The hinge blade 118 is provided at its lower end with a struck-out portion or protuberance 126 which engages the under surface of the horizontal portion of the lug 112 to limit the upward movement of the blade relative to said lug. An opening 128 intermediate the ends of the blade 118 cooperates with a struck-out lug or finger 130 at the lower edge of the strap 106 when the upper section is in its inverted position to lock the upper section (as shown in Fig. 21) against vertical translation, that is to say, against being lifted directly upward.

The laterally extending lug 114 of the hinge strap 106 provides a rest for the lug 100 of the upper hinge strap 92 when the upper section is in its intermediate position substantially at right angles to the lower section (as shown in Fig. 20). An additional laterally extending lug 132 bent from the hinge strap 106 in juxtaposition to the lug 114 is alined with the inner edge portion of the lug 100 of the upper hinge strap and cooperates with said last mentioned lug to retain the upper section in its intermediate position. In juxtaposition to the left-hand lug 132 (Fig. 17) the hinge strap 106 is provided with a slot 134 in registry with a like slot in the shell 18 of the lower section and through these alined slots the cable 14 passes into the lower shell where it is secured to the usual heating element (not shown). A ring or eyelet 136 (Fig. 17) maintains the cable in its proper position in these slots.

Centrally, and at its upper edge, the strap 106 is provided with an opening in registry with the opening at 28 in the shell of the lower section, the opening in the strap receiving the drain 30 of said section. The usual terminal pins 138 are insulatingly mounted on one end of the shell 18 of the lower section and are connected internally in any conventional manner to the heating element of the lower section and to the cable 14.

Various relative positions which the upper and lower sections may assume and the manner in which the hinge means 10 and 12 cooperate to limit the movement of the sections and to retain them in certain positions are shown in Figs. 11, 14 and 17 to 22.

When the upper and lower sections are in closed position, horizontal movement of the upper section relative to the lower section is limited by the engagement of the hinge blades 118 with the stops 120 and the fingers 130, the stops 120 limiting the movement of the upper section in one direction and the fingers 130 limiting its movement in the other direction. The upper section, which may move vertically from the position shown in Fig. 18 to the position shown in Fig. 19 to accommodate articles of different thicknesses or to permit expansion of the article being cooked or toasted, is limited by the engagement of the protuberance 126 with the under surface of the horizontal portion of the lug 112.

The upper section, in its intermediate position substantially at right angles to the lower section, to which position it may be moved for the purpose of placing an article upon the grid of the lower section, is retained in such position by the engagement of the lug 100 of the upper hinge with the lugs 114 and 132 of the lower hinge and by the engagement of the hinge blade 118 with the finger 130 of the lower hinge. In the intermediate position, the upper section may be swung back to a closed position merely by rotating the upper section about the hinge pin 124 or it may be swung to the inverted position of Fig. 21 by first raising the upper section to free the lugs 100 from the lugs 132 and then rotating the upper section rearwardly about the hinge pin 124.

The movement of the upper section to its inverted position is limited by the engagement of the outer edges of the lugs 114 with the peripheral flange 20 of its shell 18 and the engagement of each hinge blade 118 with one edge of an opening 140 in the base plate 40 and is retained in this position against vertical translation by the engagement of the fingers 130 with the lower edges of the openings 128 in the hinge blades 118 (as shown in Fig. 21).

In this inverted position the auxiliary supporting means 56 may be operated to the position shown in Fig. 11 to offer further support to the upper section.

From the inverted position the upper section may be directly swung to the intermediate position or to the fully closed position by merely rotating the section about its hinge pins 124. In moving from the inverted position, the outer edges of the lugs 100 engage the upper surfaces of the lugs 132 and the upper section momentarily pivots about the edges of these lugs 100, thereby moving the hinge pins 124 toward the lower section and freeing the hinge blades 118 and fingers 130 and then lifting the hinge pins from their lowermost position shown in Fig. 21 to the position shown in Fig. 20 or the position shown in Fig. 18.

In all the relative positions of the upper and lower sections, the drains 30 will allow the drippings from the articles being cooked or toasted to drain off the grids and into the receptacle 32.

In the form shown in Figs. 23 to 25, the receptacle for receiving the grid drippings from the drains 30 comprises a shallow pan 142 having an outwardly turned peripheral flange 144, the pan being located in position and restrained against movement by spaced lugs 146, 148 and 150 similar to the lugs 34, 36 and 38, and similarly struck out from the plate 40 of the base.

Means 152 is provided for directing the grid drippings from the drains 30 into the pan 142 and for preventing splashing of the drippings outwardly of the pan and onto the table or other stand on which the toaster may be supported in use. This means comprises a plate 154, preferably of sheet metal, and is provided at its opposite ends with downwardly and inwardly turned lugs or ears 156 and 158 adapted to fit over the flange 144 at the ends of the pan 152. A downwardly turned lug or flange 160 extends from the rear of the plate 154 and is adapted to engage a portion of the flange 144 along the rear side of the pan 132 to limit the movement of the plate transversely of the pan whereby the rear portion of the pan is completely covered.

An arm 162 formed integrally with the plate 154 extends upwardly therefrom and is provided with side flanges 164 and 166 terminating closely adjacent the plate 154. The arm 162 with its side flanges 164 and 166 directs the drippings from the drains 30, in all positions which the grids 22 may assume, into the pan or receptacle 142 and the plate 154 in totally covering the rear portion of this pan prevents the splashing of the grease or other drippings out of the pan and thereby maintains the appearance of the stand or other supporting surface upon which the toaster may be placed in use.

The downwardly and inwardly turned ears or lugs 156 and 158 provide means cooperating with the peripheral flange 142 of the pan to guide the plate 154 into its proper position thereon.

In the modification shown in Figs. 27 to 29, the handle 168 comprises a cylinder 170 of any suitable heat insulating material and cut to provide a flat rear surface 172. A metal strap 174, substantially similar to the strap 58 of Figs. 3 to 10, is similarly secured to the shell 18 of the upper section of the toaster. Spaced screws 176 secure the cylinder 170 to the strap 174. A transverse portion of the strap 174 is provided with countersunk openings to receive the heads of the attaching screws 176, these openings being formed by striking out portions of the metal to provide a frustoconical lip or flange 178. Metal cylinders 180 surround the attaching screws 176 and space the cylinder 170 from the strap 174. These cylinders are each provided with an outwardly extending peripheral lip or flange 182 seating upon the flange 178 and a peripheral flange 184 seating in an appropriate recess provided in the flat rear face 172 of the cylinder 170. These cylinders are of heat conducting material and space the heat insulating cylinder 170 of the handle from the strap 174 to permit a circulation of air between the strap and the heat insulating cylinder, and thereby maintain this cylinder at a lower operating temperature.

A small plate or bar 186, similar to the plate 76, is pivoted to the rear face of the transverse portion of the strap 174 by a pin or rivet 188, this plate or bar forming an auxiliary supporting means for the upper section 6 of the toaster, and when in collapsed position being concealed by the handle means 168. This plate or bar 186 is provided with an upwardly inclined or curved lug 190 extending forwardly of the plate and over the transverse portion of the strap 174 to provide means for moving the plate or bar from a collapsed position to an extended position, and the length of this lug 190 is such that in extended position it engages the strap 174 and its movement is limited thereby so that in such extended position the plate or bar is substantially at right angles to the plane through the open end of the upper section 6.

It will be evident from the foregoing description that applicant has provided an electric heating appliance adapted for use as a sandwich toaster or grill, the upper section of which is readily vertically movable to accommodate articles of different thicknesses and to allow for expansion or contraction of the article, the hinge means of which appliance is adapted to allow several different positions of the upper section relative to the lower section.

The invention is hereby claimed as follows:

1. In an electric cooking appliance, a pair of upper and lower heating sections, hinge straps secured to said upper and lower sections, one of said hinge straps having lugs forming hinge pintles, hinge blades pivotally connected to said hinge pintles and extending therefrom, apertured lugs carried by the other hinge strap for tiltably and slidably receiving said hinge blades, interengaging lugs carried by said hinge straps for retaining the upper section substantially at right angles to the lower section, said hinge blades each having an aperture therein, and a lug projecting from the said other hinge strap to be received in said aperture when the upper section is moved to an inverted position to prevent vertical movement of the upper section relative to the lower section.

2. In an electric cooking appliance, a pair of upper and lower heating sections, a hinge strap secured to said upper section, a hinge strap secured to said lower section in juxtaposition to the first hinge strap, one of said hinge straps having a plurality of pairs of spaced lugs forming hinge pintles, hinge blades pivotally connected to said hinge pintles and depending therefrom, apertured lugs carried by the other hinge strap for tiltably and slidably receiving said hinge blades to permit relative vertical movement of said sections, means associated with said hinge blades for engaging said apertured lugs to limit the vertical movement of the upper section relative to the lower section, interengaging means carried by said hinge straps for retaining the upper section substantially at right angles to the lower section, each of the hinge blades having an aperture therein, and a lug projecting from the said other hinge strap to be received in said aperture when the upper section is moved to an inverted position to limit the vertical movements of said upper section relative to the lower section.

3. In an electric cooking appliance, upper and lower heating sections, means connecting the upper section to the lower section for movement from a closed position to an inverted position substantially at an angle of 180 degrees relative to the lower section, handle means for moving the upper section, auxiliary supporting means concealed in its collapsed position by said handle means, and means for operating said auxiliary supporting means to an extended position to support the upper section in inverted position.

4. In an electric cooking appliance, upper and lower heating sections, means connecting the upper section to the lower section for movement from a closed position to an inverted position substantially at an angle of 180 degrees relative to the lower section, handle means for moving the upper section, and auxiliary supporting means concealed in its collapsed position by said handle means, said handle means comprising a bar secured to the upper section and having a transverse portion spaced therefrom to receive said auxiliary supporting means.

5. In an electric cooking appliance, upper and lower heating sections, means connecting the upper section to the lower section for movement from a closed position to an inverted position, handle means for operating the upper section, and auxiliary supporting means to support the upper section in inverted position, said handle means comprising a bar secured to the upper section and having a transverse portion spaced therefrom, and said auxiliary means comprising a bar member mounted for pivotal movement relative to the upper section and adapted to lie in the space between the transverse portion of the first mentioned bar and the upper section when in collapsed position.

6. In an electric cooking appliance, upper and lower heating sections, means connecting the upper section to the lower section for movement from a closed position to an inverted position, handle means for operating the upper section, and auxiliary supporting means to support the upper section in inverted position, said handle means comprising a bar secured to the upper section and having a transverse portion spaced therefrom, and handle receiving means fastened to said bar and extending outwardly therefrom, said auxiliary means comprising a bar member mounted for pivotal movement relative to the upper section and adapted to lie in the space between the transverse portion of the first mentioned bar and the upper section when in collapsed position.

7. In an electric cooking appliance, upper and lower heating sections each comprising a shell, means connecting the shell of the upper section to the shell of the lower section to permit movement of the upper section from the closed position to an inverted position, handle means for operating the upper section from one position to the other, auxiliary supporting means to support the upper section in inverted position, said handle means comprising a bar having end portions forming attaching lugs passing through the shell of the upper section and secured to the inner wall thereof, said bar having a transverse portion spaced from the shell of the upper section, a handle supporting bar and means for clamping said handle supporting bar to said first mentioned bar, said auxiliary supporting means comprising a lever pivoted to the first mentioned bar and lying in collapsed position within the space between the transverse portion of the first mentioned bar and the shell of the upper section, said lever having a forwardly bent portion overlying the transverse portion of the bar to provide means for moving the lever to an extended position substantially at right angles to the transverse portion of the first mentioned bar to support the upper section in inverted position.

8. In an electric cooking appliance, upper and lower heating sections each comprising a shell, means connecting the shell of the upper section to the shell of the lower section to permit movement of the upper section from the closed position to an inverted position, handle means for operating the upper section from one position to the other, auxiliary supporting means to support the upper section in inverted position, said handle means comprising a bar having end portions forming attaching lugs passing through the shell of the upper section and secured to the inner wall thereof, said bar having a transverse portion spaced from the shell of the upper section, and a heat insulating block forming a handle secured to the transverse portion of said bar, said auxiliary means comprising a lever pivoted to said shell and concealed when in collapsed position by the transverse portion of the bar, said lever having a laterally extending flange overlying the transverse portion of the bar to limit the movement of said lever relative to said bar, said flange having an end portion bent upwardly to provide an operating lug by which the lever may be moved to its collapsed or extended positions.

9. In an electric heating appliance, a heating section having a grid adapted to assume a horizontal position, said grid being provided with means to drain the same in said horizontal position to prevent accumulation thereon of drippings from the articles being heated, a receptacle spaced below said section, and means for directing the drippings from the drain means of said grid into said receptacle.

10. In an electric cooking appliance, a base, upper and lower heating sections above said base, each of said sections having a shell and a grid, said shells and grids being provided with means to drain said grids to prevent accumulation thereon of drippings from the articles being cooked, a receptacle on said base beneath said sections and said drains, and a member fitting onto said receptacle and having a portion forming a duct extending from said receptacle substantially to the level of said drains for directing the drippings from said drains into the receptacle.

11. In an electric cooking appliance, a base, upper and lower heating sections above said base, each of said sections having a shell and a grid, said shells and grids being provided with means to drain said grids to prevent accumulation thereon of drippings from the articles being cooked, an open receptacle on said base beneath said sections and said drains, and a member having a base portion overlying a portion of the open end of said receptacle and having a portion extending upwardly from said base substantially to the level of said drains and forming a duct for directing the drippings from said drains into the receptacle, the base portion of said member preventing splashing of the drippings out of the receptacle.

12. In an electric cooking appliance, a base, upper and lower heating sections above said base, each of said sections having a shell and a grid, said shells and grids being provided with means to drain said grids to prevent accumulation thereon of drippings from the articles being cooked, an open receptacle having a flange portion extending laterally from the open top thereof, a member having a base portion adapted to extend partially over the open end of the receptacle, said base portion being provided with suitably shaped lugs slidably receiving the flange portion of the receptacle, said member having a channel shaped portion extending upwardly from the base portion thereof substantially to the level of the drains, said channel shaped portion directing the drippings from said drains into the receptacle and said base portion preventing splashing of the drippings out of the receptacle.

13. In an electric cooking appliance, upper and lower heating sections, means connecting the upper section to the lower section for movement from a closed position to an inverted position substantially at an angle of 180 degrees relative to the lower section, handle means for moving the upper section, and auxiliary supporting means concealed in its collapsed position by said handle means, said handle means comprising a bar secured to the upper section and having a transverse portion spaced therefrom to receive said auxiliary supporting means, a handle of heat insulating material, means for fastening said handle to the transverse portion of said bar and a spacing member of heat conducting material enclosing said fastening means and interposed between said handle and transverse portion of said bar, said spacing member permitting a circulation of air between the handle and the bar to maintain the handle at a relatively low temperature.

14. In a cooking appliance, upper and lower heating sections, a hinge link pivotally connected to one of said sections to permit swinging of said section on said link to an inverted position relative to the other section, a laterally extending lug secured to the other section, said hinge link being slidably received in said lug to permit relative translation of said sections and elements extending laterally from each section for operative engagement when the pivoted section is swung to an intermediate position to retain the pivoted section in said intermediate position, said elements being releasable upon relative translation of said sections to permit swinging of said pivoted section to its inverted position.

15. In a cooking appliance, an upper heating section, a lower heating section, means for connecting said sections to permit the upper section to be swung from a first, superposed, position with respect to the lower section to a second position substantially at right angles to the lower section, and to a third, inverted, position substantially at an angle of 180 degrees to the lower section, said means including an element pivoted to the upper section, means on said lower section for slidably receiving said element for vertical movement in any position of the upper section to permit vertical translation of the upper section relative to the lower section, and interengageable elements carried by said upper and lower sections and operative when the upper section is swung to the second position for holding the upper section against swinging to the third position while permitting swinging of the upper section to the first position and also permitting vertical translation of the upper section to release said interengageable elements whereby the upper section may be pivoted on the first mentioned element into the third position.

16. In an electric cooking appliance, a pair of upper and lower heating sections, hinge brackets secured to said upper and lower sections, a hinge link pivoted to one of said hinge brackets and extending therefrom, an apertured lug carried by the other hinge bracket for slidably receiving said hinge link, and interengaging lugs carried by the respective sections for retaining the sections in an open position substantially at right angles to each other.

17. In a cooking appliance, a pair of upper and lower heating sections, hinge plates secured to said upper and lower sections, one of said hinge plates having an outwardly extending lug forming a hinge pintle, a hinge link pivotally connected to said hinge pintle and extending therefrom, an apertured lug extending laterally from the other hinge plate for slidably receiving said hinge link, a second lug extending outwardly from the last mentioned hinge plate above said apertured lug and a third lug extending outwardly from the first mentioned hinge plate below the axis of the hinge pintle, said second and third lugs being adapted to engage and retain the sections in a position substantially at right angles to each other, said lugs being releasable upon raising of one section to permit swinging of said raised section into inverted position relative to the other section.

18. In a cooking appliance, a pair of upper and lower heating sections, hinge plates secured to said upper and lower sections, one of said hinge plates having an outwardly extending lug forming a hinge pintle, a hinge link pivotally connected to said hinge pintle and extending therefrom, an apertured lug extending laterally from the other hinge plate for slidably receiving said hinge link, a second lug extending outwardly from the last mentioned hinge plate above said apertured lug and a third lug extending outwardly from the first mentioned hinge plate below the axis of the hinge pintle, said second and third lugs being adapted to engage and retain the sections in a position substantially at right angles to each other, said lugs being releasable upon raising of one section to permit swinging of said raised section into inverted position relative to the other section, and means engaging the hinge link for preventing raising of the inverted section while permitting swinging of said inverted section to its original superposed position with respect to the other section.

19. In a cooking appliance, upper and lower heating sections having each a pan-shaped shell and a pan-shaped grid mounted in the shell, means connecting said upper and lower sections to permit relative swinging movement into a plurality of positions, the peripheral flange of each of said shells and the peripheral flange of the associated grid having alined openings located centrally between the ends of the grid and shell and substantially flush with the bottom of the grid whereby to drain said grid in all relative positions to which said sections may be moved.

20. In a cooking appliance, upper and lower heating sections having each a pan-shaped shell and a pan-shaped grid mounted in the shell, means connecting said upper and lower sections to permit relative swinging movement into a plurality of positions, a lip formed in the peripheral flange of each grid centrally between the ends of the grid and substantially flush with the bottom of the grid, said lip projecting outwardly beyond the peripheral flange of the associated shell whereby to drain said grids in all relative positions to which said sections may be moved.

21. In a cooking appliance, upper and lower heating sections, a pair of hinge straps secured to the rear wall of said upper and lower heating sections, one of said hinge straps having a rearwardly extending portion forming a hinge pintle, a hinge blade pivoted to said hinge pintle and extending therefrom toward the second hinge strap, said second hinge strap having a rearwardly projecting lug apertured to slidably receive said hinge plate, the first hinge strap having a lug projecting rearwardly and having one face disposed below the axis of the hinge pintle, the second hinge strap having spaced rearwardly extending lugs adapted to engage the edge and face of the lug projecting from the first hinge strap when the upper section is moved to a position substantially at right angles to the lower section to support and lock said upper section in said position, said interengaging lugs being releasable upon the raising of said upper section from said position to permit swinging of the upper section into an inverted position substantially at 180 degrees to the lower section.

JAMES J. GOUGH.